Patented Sept. 24, 1935

2,015,115

UNITED STATES PATENT OFFICE 2,015,115

AROMATIC ETHER OF GLYCOL

Lucas P. Kyrides, St. Louis, Mo., assignor to National Aniline & Chemical Company, Inc., New York, N. Y., a corporation of New York No Drawing. Application February 21, 1930, Serial No. 430,445

1 Claim. (Cl. 260—150)

This invention relates to the production of a new aromatic ether of glycol which may be utilized per se and as an intermediate product in organic synthesis, and in the manufacture of pharmaceuticals and of dyestuffs.

The new aromatic glycol ether of the present invention is the hydroxyethyl ether of resorcinol and corresponds in structure and composition with the following probable formula:

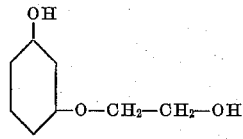

In the preparation of the hydroxyethyl ether of resorcinol, the monoalkali metal salt of resorcinol may be treated with ethylene chlorhydrin in aqueous medium; or resorcinol itself may be treated with ethylene chlorhydrin in the presence of a caustic alkali, as for example sodium hydroxide, potassium hydroxide, etc., and of any suitable medium or solvent, e. g., water.

The invention accordingly comprises a product possessing the features, properties, and the relation of components which will be exemplified in the product hereinafter described and the scope of the invention will be indicated in the claim.

As an illustrative embodiment of a manner in which the invention may be practiced for the preparation of the hydroxyethyl ether, the following example is presented. The parts are by weight.

Example 1.—41.2 parts of resorcinol are dissolved in 41 parts of caustic soda solution having a specific gravity of 1.39, and to this solution there is added 78.5 parts of a 27 per cent. aqueous solution of ethylene chlorhydrin. The mixture is well agitated for about 24 hours at a temperature of about 50° to 55° C. under a reflux condenser. When the reaction is completed, the mixture is allowed to cool and it is then extracted several times with ether. The ether solution, after being dried over anhydrous sodium sulfate, is subjected to vacuum fractional distillation, and the portion boiling between 214° to 218° C. (corr.) at 20 mm. is separately collected. This portion upon crystallization first from benzene and then from water, gives a crystalline product which is substantially pure mono-beta-hydroxyethyl ether of resorcinol having the following probable formula:

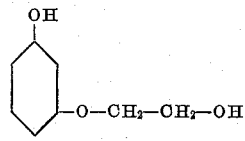

The product is soluble in water, ether, and benzene, and has a melting point of 83.1–83.4° C., and a boiling point of about 214° C. at 20 mm.

This application is a continuation in part of my co-pending application, Serial No. 542,749, filed March 10, 1922.

Since certain changes may be made in the above product and different embodiments of the invention could be made without departing from the scope thereof, it is intended that all matter contained in the above description shall be interpreted as illustrative and not in a limiting sense.

I claim:

As a new product, a monohydroxyethyl ether having the following probable formula:

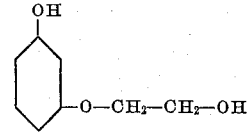

said product being soluble in water, ether and benzene, and having a melting point of about 83.1° to 83.4° C., and a boiling point of about 214° C. at a pressure of 20 mm.

LUCAS P. KYRIDES.